US012192960B2

United States Patent
Gonuguntla et al.

(10) Patent No.: US 12,192,960 B2
(45) Date of Patent: Jan. 7, 2025

(54) USER EQUIPMENT, METHOD OF USER EQUIPMENT, NETWORK NODE, AND METHOD OF NETWORK NODE

(71) Applicant: NEC Corporation, Tokyo (JP)

(72) Inventors: Venkatarao Gonuguntla, Tamil Nadu (IN); Hisashi Futaki, Tokyo (JP); Tetsu Ikeda, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 623 days.

(21) Appl. No.: 17/442,801

(22) PCT Filed: Dec. 19, 2019

(86) PCT No.: PCT/JP2019/049913
§ 371 (c)(1),
(2) Date: Sep. 24, 2021

(87) PCT Pub. No.: WO2020/194935
PCT Pub. Date: Oct. 1, 2020

(65) Prior Publication Data
US 2022/0182980 A1 Jun. 9, 2022

(30) Foreign Application Priority Data
Mar. 27, 2019 (IN) .............................. 201911012023

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/23* (2023.01); *H04W 80/02* (2013.01)

(58) Field of Classification Search
CPC ............. H04W 72/02; H04W 72/0446; H04W 72/0453; H04W 72/23; H04W 72/56; H04W 76/22; H04W 76/12
See application file for complete search history.

(56) References Cited

U.S. PATENT DOCUMENTS

| | | | |
|---|---|---|---|
| 2005/0249117 A1* | 11/2005 | Gerkins | .............. H04L 47/2441 370/235 |
| 2011/0170495 A1 | 7/2011 | Earnshaw et al. | |

(Continued)

OTHER PUBLICATIONS

International Search Report for PCT Application No. PCT/JP2019/049913, mailed on Jan. 21, 2020.

(Continued)

*Primary Examiner* — Jamal Javaid
(74) *Attorney, Agent, or Firm* — Sughrue Mion, PLLC

(57) ABSTRACT

The present disclosure discloses a method for a User Equipment (UE). The method comprises: establishing a communication session with a network node for transmission of data; receiving a configuration message indicating information for one or more of transmission slots for a plurality of logical channels; setting up for transmission of data based on the received configuration message to select one or more logical channels of the plurality of logical channels; and prioritizing the selection of plurality of logical channels when the UE is indicative of initiation of transmission of data.

15 Claims, 7 Drawing Sheets

(51) Int. Cl.
*H04W 72/0453* (2023.01)
*H04W 72/23* (2023.01)
*H04W 80/02* (2009.01)

(56) References Cited

U.S. PATENT DOCUMENTS

2015/0201426 A1 7/2015 Yi et al.
2018/0070372 A1 3/2018 Yi et al.
2018/0270839 A1 9/2018 Loehr et al.

OTHER PUBLICATIONS

3GPP TR 21.905: "Vocabulary for 3GPP Specifications", V15.0.0 (Mar. 2018), pp. 1-66.
3GPP TS 23.501: "System Architecture for the 5G System, Stage 2", V15.2.0 (Jun. 2018), pp. 1-216.
3GPP TS 23.502: "Procedures for the 5G System; Stage 2", V15.2.0 (Jun. 2018), pp. 1-308.
3GPP TS 24.501: "Non-Access-Stratum (NAS) protocol Stage 3", V15.0.0 (Jun. 2018), pp. 1-337.
3GPP TS 38.413: "NG Application Protocol (NGAP)", V15.0.0 (Jun. 2018), pp. 1-264.
3GPP TS 38.331: "Radio Resource Control (RRC) protocol specification", V15.4.0 (Dec. 2018), pp. 1-474.
3GPP TS 38.321: "Medium Access Control (MAC) protocol specification", V15.4.0 (Dec. 2018), pp. 1-77.
3GPP TR 22.804: "Study on Communication for Automation in Vertical Domains", V16.2.0 (Dec. 2018), pp. 1-196.
Convida Wireless, "Prioritization and Pre-emption of PUSCH Transmissions for I-IoT", 3GPP TSG-RAN WG2 #105 R2-1901569, Feb. 25, 2019, pp. 1-3.
MediaTek Inc., "Enhancements to logical channel prioritization", 3GPP TSG-RAN WG2 Adhoc_2017_06_NR R2-1707264, Jun. 27, 2017, pp. 1-6.

* cited by examiner

USER EQUIPMENT, METHOD OF USER EQUIPMENT, NETWORK NODE, AND METHOD OF NETWORK NODE

This application is a National Stage Entry of PCT/JP2019/049913 filed on Dec. 19, 2019, which claims priority from Indian patent application No. 201911012023 filed on Mar. 27, 2019, the contents of all of which are incorporated herein by reference, in their entirety.

TECHNICAL FIELD

The present disclosure relates to a method for enhancing the logical channel prioritization for NR IIOT and future applications in this technical field.

BACKGROUND ART

Logical Channel Prioritization: When there are more than one application with different QoS requirements, UE needs to perform Logical channel prioritization to choose between logical channels to perform transmission. Logical channel prioritization (LCP) is explained in FIG. 1.

Logical channel prioritization is configured by network with the help of RRC parameters, which defines how to choose data from different logical channels. Parameters which define LCP procedure are:
- priority: where an increasing priority value indicates a lower priority level;
- prioritisedBitRate: which sets the Prioritized Bit Rate (PBR);
- bucketSizeDuration: which sets the Bucket Size Duration (BSD).

In the example shown in FIG. 1, UE is configured with three logical channels with respective priority, PBR and BSD configured for each logical channel. When a UE is scheduled with UL resource grant, UE has to perform LCP to form MAC PDU. Selection of logical channels depends on its priority. That means higher priority logical channel gets selected first and moved to next higher priority logical channel. This process will happen till the UL resource grant is full/UE has data. Selection of data from logical channels happen in two phases or steps, amount of data selected from each logical channel in each step depends on configured parameters PBR and BSD.

In the first phase of allocation, UE selects PBR amount data from each logical channel till the allocated UL resource grant is full. If UL resource grant is not full after selection of PBR amount of data from each logical channel, it moves to second phase.

In second phase, UE selects R1 amount of data (which depends on configured BSD) from each logical channel till the UL resource grant is full. If resource is left after UE selects R1 then only it moves to select R2, R3 and so on.

Whenever UE receives or process UL grant, UE has to perform LCP to form MAC Protocol Data Unit (PDU) for transmission. Existing logical channel prioritisation order (highest priority listed first) is listed below:
- C-RNTI MAC Control Element (CE) or data from UL-Common Control Channel (UL-CCCH)
- Configured Grant Confirmation MAC CE
- MAC CE for Buffer Status Report (BSR), with exception of BSR included for padding
- Single Entry Power Headroom Report (PHR) MAC CE or Multiple Entry PHR MAC CE
- Data from any Logical Channel, except data from UL-CCCH
- MAC CE for Recommended bit rate query
- MAC CE for BSR included for padding According to 4G standards and/or current 5G standards, sufficient LCP cannot be performed for 5G requirement.

When a UE process UL grant, it has to run LCP procedure to select data to be transmitted on granted UL resource. According to existing logical channel prioritization, BSR and PHR MAC CE get higher priority than Ultra-Reliable Low-Latency Communication (URLLC) data logical channel. When BSR/PHR MAC CE and URLLC logical channels have data waiting in the queue for transmission, if the length of the MAC CE, i.e. BSR and PHR is large, the remaining TB size may not be enough for the urgent IIOT packet (IIOT is a sub class of URLLC). This results in the segmentation of the IIOT packet, which will cause additional delay to complete the IIOT packet as it has to wait for next transmission opportunity. As a result, URLLC application may not be able satisfy strict end to end latency, which can result in application failure.

In the scenario, where a UE receives a dynamic grant for uplink transmission, the associated PUSCH of which overlaps in time with reserved uplink resources activated by configured grant which is activated by RRC or PDCCH. According to the priority rule defined in Rel-15, dynamic grant always overrides configured grant in situations of resource conflict between them. However, this may not be desirable in some cases as configured grants are typically used to cater URLLC traffics, and it may be problematic if URLLC can be punctured by another dynamic grant.

In the scenario where a UE sequentially receives two dynamic grants from the (R)AN node for uplink transmission with overlapped PUSCH resources in time. For such cases, currently there is no existing mechanism or rules for the UE to determine how to handle prioritization of these two grants.

CITATION LIST

Non Patent Literature

NPL 1: 3GPP TR 21.905: "Vocabulary for 3GPP Specifications". V15.0.0 (2018 March).
NPL 2: 3GPP TS 23.501: "System Architecture for the 5G System; Stage 2". V15.2.0 (2018 June).
NPL 3: 3GPP TS 23.502: "Procedures for the 5G System; Stage 2" V15.2.0 (2018 June).
NPL 4: 3GPP TS 24.501: "Non-Access-Stratum (NAS) protocol Stage 3" V15.0.0 (2018 June).
NPL 5: 3GPP TS 38.413: "NG Application Protocol (NGAP)" V15.0.0 (2018 June).
NPL 6: 3GPP TS 38.331: "Radio Resource Control (RRC) protocol specification" V15.4.0 (2018 December).
NPL 7: 3GPP TS 38.321: "Medium Access Control (MAC) protocol specification" V15.4.0 (2018 December).
NPL 8: 3GPP TR 22.804: "Study on Communication for Automation in Vertical Domains" V16.2.0 (2018 December).

SUMMARY OF INVENTION

The following presents a simplified summary of the subject matter in order to provide a basic understanding of some aspects of subject matter instances. This summary is not an extensive overview of the subject matter. It is not intended to identify key/critical elements of the aspects or to delineate the scope of the subject matter.

Its sole purpose is to present some concepts of the subject matter in a simplified form as a prelude to the more detailed description that is presented later.

Solution to Problem

According to an aspect of the present disclosure, a method for a User Equipment (UE) is disclosed, which comprises: establishing a communication session with a network node for transmission of data; receiving a configuration message indicating information for one or more of transmission slots for a plurality of logical channels; setting up for transmission of data based on the received configuration message to select one or more logical channels of the plurality of logical channels; and prioritizing the selection of plurality of logical channels when the UE is indicative of initiation of transmission of data.

According to an aspect of the present disclosure, the setting up of the UE is based on at least one of: addition of Radio Link Control (RLC) bearer, modification of RLC bearer, Medium Access Control (MAC) entity configuration, or MAC reconfiguration.

According to an aspect of the present disclosure, the transmission of data is configured for each logical channel per MAC entity based on at least one of: increasing priority value, Prioritized Bit Rate (PBR), and Bucket Size Duration (BSD).

Further, according to an aspect of the present disclosure, the prioritization is regulated by configuring mapping restrictions for each logical channel based on at least one of: allowed Subcarrier Spacing(s) for transmission, maximum Physical Uplink Shared Channel (PUSCH) duration, grant type, allowed cell, or number of allowed transmission slots.

Yet, in another aspect of the present disclosure, in an event of availability of more than one uplink grants, the method comprises: prioritizing the plurality of logical channels to determine a parameter with an arbitrary value for each of the uplink grants; and selecting an uplink grant with the determined parameter having the minimum arbitrary value for the transmission of data in a transmission session.

In an aspect of the present disclosure, the transmission of data is performed in a descending order of time critical data for the transmission session, and wherein the transmission of data is based on a selection of the uplink grant.

In an aspect of the present disclosure, a User Equipment (UE) is disclosed, which comprises at least one radio transceiver; and at least one processor coupled to the at least one radio transceiver, wherein the at least one processor is configured to: establish a communication session with a network node for transmission of data; receive a configuration message indicating information for one or more of transmission slots for a plurality of logical channels; set up for transmission of data based on the received configuration message to select one or more logical channels of the plurality of logical channels; and prioritize the selection of plurality of logical channels when the UE is indicative of initiation of transmission of data.

In an aspect of the present disclosure, the setting up is based on at least one of: addition of Radio Link Control (RLC) bearer, modification of RLC bearer, Medium Access Control (MAC) entity configuration, or MAC reconfiguration.

In an aspect of the present disclosure, the transmission of data is configured for each logical channel per MAC entity based on at least one of: increasing priority value, Prioritized Bit Rate (PBR), and Bucket Size Duration (BSD).

In an aspect of the present disclosure, the prioritization is regulated by configuring mapping restrictions for each logical channel based on at least one of: allowed Subcarrier Spacing(s) for transmission, maximum Physical Uplink Shared Channel (PUSCH) duration, grant type, allowed cell, or number of allowed transmission slots.

In an aspect of the present disclosure, in an event of availability of more than one uplink grants, the at least one processor is configured to: prioritize the plurality of logical channels to determine a parameter with an arbitrary value for each of the uplink grants; and select an uplink grant with the determined parameter having the minimum arbitrary value for the transmission of data in a transmission session.

In an aspect of the present disclosure, the transmission of data is performed in a descending order of time critical data for the transmission session, and wherein the transmission of data is based on a selection of the uplink grant.

In an aspect of the present disclosure, a network node for enhancing logical channel prioritization for transmission of data with a UE is disclosed, the node comprises: at least one processor controller; at least one transceiver circuit operatively coupled with the at least one processor; at least one network interface operatively coupled with the at least one processor; and at least one memory operatively coupled with the at least one processor, wherein the processor causes the network node to: establish a communication session with a UE for the transmission of data; receive a session resource setup request sent from a core network; send a session resource setup response to the session resource setup request to the core network; and send a configuration message indicating information for one or more of transmission slots for a plurality of logical channels for the UE to the UE, wherein the UE is set up for the transmission of data based on the configuration message to select one or more logical channels of the plurality of logical channels, and wherein the selection of plurality of logical channels are prioritized when the network node is being indicative of initiation of the transmission of data.

In an aspect of the present disclosure, the setting up is based on at least one of: addition of Radio Link Control (RLC) bearer, modification of RLC bearer, Medium Access Control (MAC) entity configuration, or MAC reconfiguration.

In an aspect of the present disclosure, the transmission of data is configured for each logical channel per MAC entity based on at least one of: increasing priority value, Prioritized Bit Rate (PBR), and Bucket Size Duration (BSD).

In an aspect of the present disclosure, the prioritization is regulated by configuring mapping restrictions for each logical channel based on at least one of: allowed Subcarrier Spacing(s) for transmission, maximum Physical Uplink Shared Channel (PUSCH) duration, grant type, allowed cell, or number of allowed transmission slots.

In an aspect of the present disclosure, in an event of availability of more than one uplink grants, the plurality of logical channels is prioritized to determine a parameter with an arbitrary value for each of the uplink grants; and an uplink grant is selected with the determined parameter having the minimum arbitrary value for the transmission of data in a transmission session.

In an aspect of the present disclosure, the transmission of data is performed in a descending order of time critical data for the transmission session, and wherein the transmission of data is based on a selection of the uplink grant.

In an aspect of the present disclosure, a method for a network node is disclosed, the method comprises: establishing a communication session with a UE for transmission of data; receiving a session resource setup request sent from a core network; sending a session resource setup response to the session resource setup request to the core network; and sending a configuration message indicating information for one or more of transmission slots for a plurality of logical channels for the UE to the UE, wherein the UE is set up for the transmission of data based on the configuration message to select one or more logical channels of the plurality of logical channels, and wherein the selection of plurality of logical channels are prioritized when the network node is being indicative of initiation of the transmission of data.

In an aspect of the present disclosure, the setting up of the UE is based on at least one of: addition of Radio Link Control (RLC) bearer, modification of RLC bearer, Medium Access Control (MAC) entity configuration, or MAC reconfiguration.

In an aspect of the present disclosure, the transmission of data is configured for each logical channel per MAC entity based on at least one of: increasing priority value, Prioritized Bit Rate (PBR), and Bucket Size Duration (BSD).

In an aspect of the present disclosure, the prioritization is regulated by configuring mapping restrictions for each logical channel based on at least one of: allowed Subcarrier Spacing(s) for transmission, maximum Physical Uplink Shared Channel (PUSCH) duration, grant type, allowed cell, or number of allowed transmission slots.

In an aspect of the present disclosure, in an event of availability of more than one uplink grants, the method comprises: prioritizing the plurality of logical channels to determine a parameter with an arbitrary value for each of the uplink grants; and selecting an uplink grant with the determined parameter having the minimum arbitrary value for the transmission of data in a transmission session.

In an aspect of the present disclosure, the transmission of data is performed in a descending order of time critical data for the transmission session, and wherein the transmission of data is based on a selection of the uplink grant.

These and other objects, aspects and advantages of the present disclosure will become readily apparent to those skilled in the art from the following detailed description of the aspects having reference to the attached Figs, the disclosure not being limited to any particular aspects disclosed.

Advantageous Effects of Invention

According to the present disclosure, it is possible to provide a User Equipment, a method of user equipment, a network node, and a method of network equipment that can prioritize a plurality of grants.

BRIEF DESCRIPTION OF DRAWINGS

The foregoing and further objects, features and advantages of the present subject matter will become apparent from the following description of exemplary aspects with reference to the accompanying drawings, wherein like numerals are used to represent like elements.

It is to be noted, however, that the appended drawings along with the reference numerals illustrate only typical aspects of the present subject matter, and are therefore, not to be considered for limiting of its scope, for the subject matter may admit to other equally effective aspects.

DESCRIPTION OF ASPECTS

Figure 1:
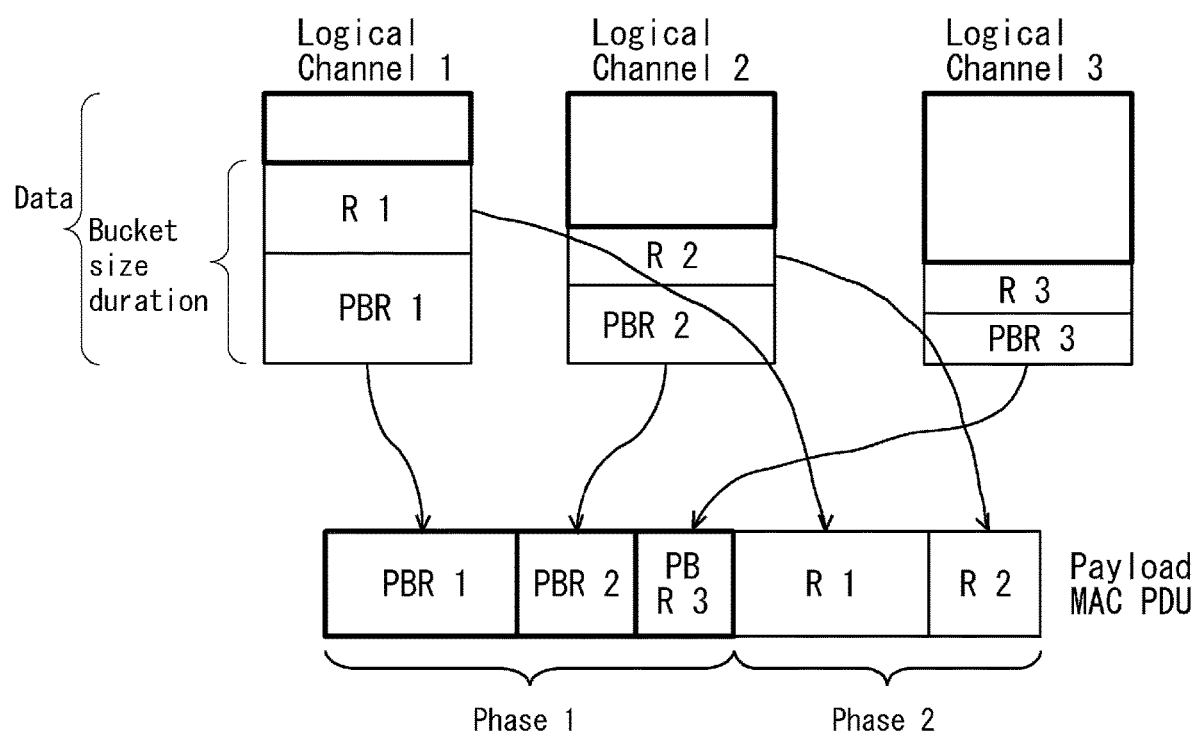
FIG. 1 illustrates Logical Channel Prioritization (LCP) in view of the general art.
Figure 2:
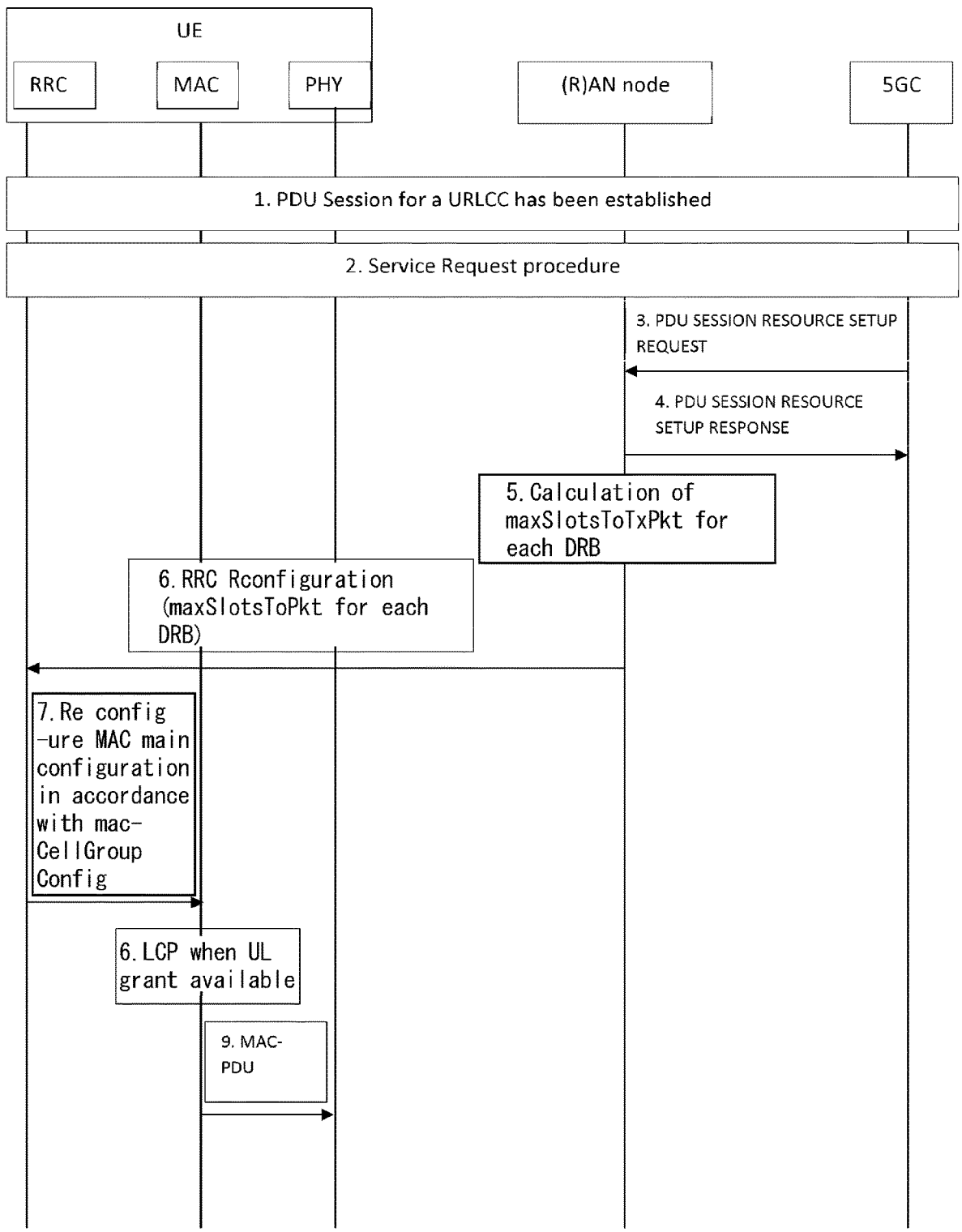
FIG. 2 illustrates Logical Channel Prioritization (LCP) in accordance with an aspect of the present disclosure.

Exemplary aspects now will be described with reference to the accompanying drawings. The disclosure may, however, be embodied in many different forms and should not be construed as limited to the aspects set forth herein; rather, these aspects are provided so that this disclosure will be thorough and complete, and will fully convey its scope to those skilled in the art. The terminology used in the detailed description of the particular exemplary aspects illustrated in the accompanying drawings is not intended to be limiting. In the drawings, like numbers refer to like elements.

It is to be noted, however, that the reference numerals in claims illustrate only typical aspects of the present subject matter, and are therefore, not to be considered for limiting of its scope, for the subject matter may admit to other equally effective aspects.

The specification may refer to "an", "one" or "some" aspect(s) in several locations. This does not necessarily imply that each such reference is to the same aspect(s), or that the feature only applies to a single aspect. Single features of different aspects may also be combined to provide other aspects.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Figs depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the Figs include the software and/or hardware components required for the unit to function. Further, each unit may comprise within itself one or more components which are implicitly understood. These components may be operatively coupled to each other and be configured to communicate with each other to perform the function of the said unit.

The central idea of this aspect of the present application can be divided into 4 steps as described below.

Step A: PDU Session Creation
1. UE establishes a PDU session with the network to service URLLC data.
2. Service request procedure.
3. 5GC send PDU session resource setup request to (R)AN node.
4. (R)AN node send PDU session resource setup accept to 5GC.

Step B: RRC Reconfiguration
5. (R)AN node compute maxSlotsToTxPkt for each DRB.
6. (R)AN node computes other Logical Channel Prioritization rules that has to be assigned to UE based on the QoS requested from the 5GC.

Step C: UE Behavior Upon RRC Reconfiguration
7. UE configure UE MAC and UE Logical channels in accordance with the received configuration from RRC reconfiguration.

Step D: Logical Channel Prioritization
8. When a grant is available, UE MAC layer perform LCP to form a MAC PDU.
9. UE MAC layer send MAC PDU (Transport Block (TB)) to UE PHY layer for transmission.

Each step of the above-mentioned four steps is described herein below:

Step A: PDU Session Creation
1. In step 1, PDU session for URLLC is established, in this step UE may be informed about the 5QI value associated with QoS flow.
2. In step 2, if the UE is in Connection Management-IDLE (CM-IDLE) state, UE requests service request procedure.
3. In step 3, AMF will request (R)AN node to assign resources on Uu and NG-U for PDU session and the corresponding QoS flows, and may setup corresponding DRBs for a given UE. For each requested PDU session, if resources are available for the requested configuration, the (R)AN node may establish at least one DRB and associate each accepted QoS flow of the PDU session to a DRB established.

Each PDU session resource setup IE contains, QoS flow level QoS parameters. QoS flow level QoS parameters contain two types of QoS descriptors called Non-dynamic 5QI Descriptor or Dynamic 5QI Descriptor. Each 5QI value is associated with a Packet Delay Budget (PDB).

Non-dynamic 5QI Descriptor IE indicates the QoS characteristics for a standardized or pre-configured 5QI for DL and UL, which are specified in TS 23.501.

Dynamic 5QI Descriptor IE indicates the QoS characteristics for a non-standardized or not pre-configured 5QI for DL and UL, which are defined in TS 38.413-f20 (clause 9.3.1.18). For Dynamic 5QI descriptor, PDB is conveyed in an integer form which has to be multiplied by 0.5 ms to get the PDB value in time.

4. In step 4, upon assigning the resources on Uu and NG-U for PDU session and corresponding QoS Flows, (R)AN node sends PDU session resource setup response.

Step B: RRC Reconfiguration
5. In step 5, (R)AN node shall compute maxSlotsToTxPkt for each DRB. The maxSlotsToTxPkt may be, for example, maximum number of transmission slots for a plurality of logical channels, or number of allowed transmission slots for a plurality of logical channels.

maxSlotsToTxPkt is defined as maxSlotsToTxPkt=floor (PDB/slotDuration).

The procedure to compute the maxSlotsToTxPkt for each DRB or associated logical channel is explained using an example below.

In a scenario where, four different applications one from each resource type of GBR, Non-GBR and two Delay Critical GBR. Let us consider the following:
  Application 1: 5QI value=85, PDB on radio interface is 3 ms (Delay Critical GBR)
  Application 2: 5QI value=2, PDB on radio interface is 150 ms (GBR)
  Application 3: 5QI value=6, PDB on radio interface is 300 ms (Non-GBR)
  Application 4: 5QI value=Optional, PDB on radio interface is 0.5 ms (Dynamic 5QI descriptor) (Delay Critical GBR).

In one example, we consider a UE operating in BWP with SCS of 30 kHz. For 30 kHz SCS of operation, slot duration is 0.5 ms.
  Application 1: 5QI value=85, PDB on radio interface is 3 ms, maxSlotsToTxPkt=6
  Application 2: 5QI value=2, PDB on radio interface is 150 ms, maxSlotsToTxPkt=300
  Application 3: 5QI value=6, PDB on radio interface is 300 ms, maxSlotsToTxPkt=600
  Application 4: 5QI value=Optional, PDB on radio interface is 0.5 ms, maxSlotsToTxPkt=1

Introducing a new prioritization parameter at UE is to inform the UE about time criticality of the packet transmission, so that LCP rules consider the latency requirement when selecting between logical channels.

Delay critical GBR for Non-Dynamic 5QI descriptor are in the range from 3 ms to 25 ms. To be precise PDB for 4 delay critical GBR are given by (3, 9, 9, 25) ms as per TS 23.501, and as per TR 22.804, 0.5 ms, 1 ms, 2 ms, 10 ms PDB has to be supported by using Dynamic 5QI descriptor.

TABLE 1

| PDB value | Slot Duration (SCS = 30 kHz) | maxSlotsToTxPkt |
|---|---|---|
| 0.5 ms | 0.5 | 1 |
| 1 ms | 0.5 | 2 |
| 2 ms | 0.5 | 4 |
| 3 ms | 0.5 | 6 |
| 9 ms | 0.5 | 18 |
| 10 ms | 0.5 | 20 |
| 25 ms | 0.5 | 50 |

If we quantize the above values, to save on the number bits used for the signaling, we can send the above information using 3 bit IE by using maxSlotsToTxPkt={1, 2, 4, 8, 16, 32, 64, Infinity}, where any value above 64 is treated as Infinity. In other words, Infinity in this context means, application is not delay critical and may not need special treatment where legacy prioritization rules are suffice to serve them.

Figure 3:
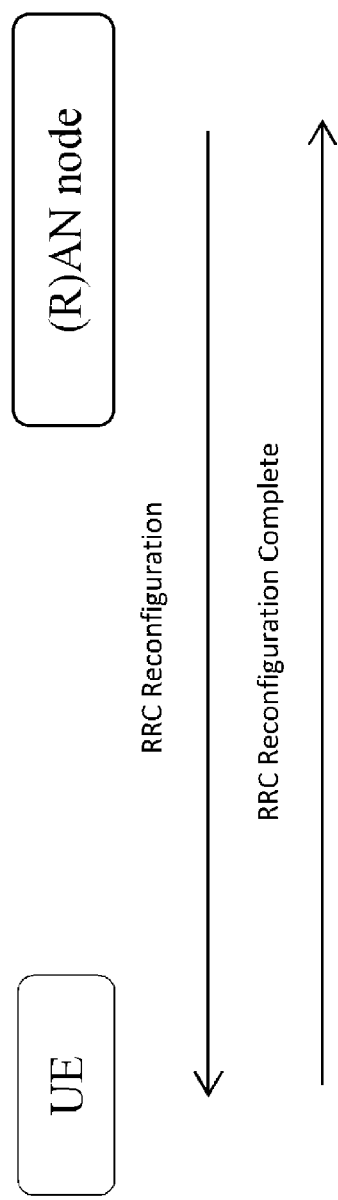
FIG. 3 illustrates a method for RRC reconfiguration in accordance with an aspect of the present disclosure.
Figure 4:
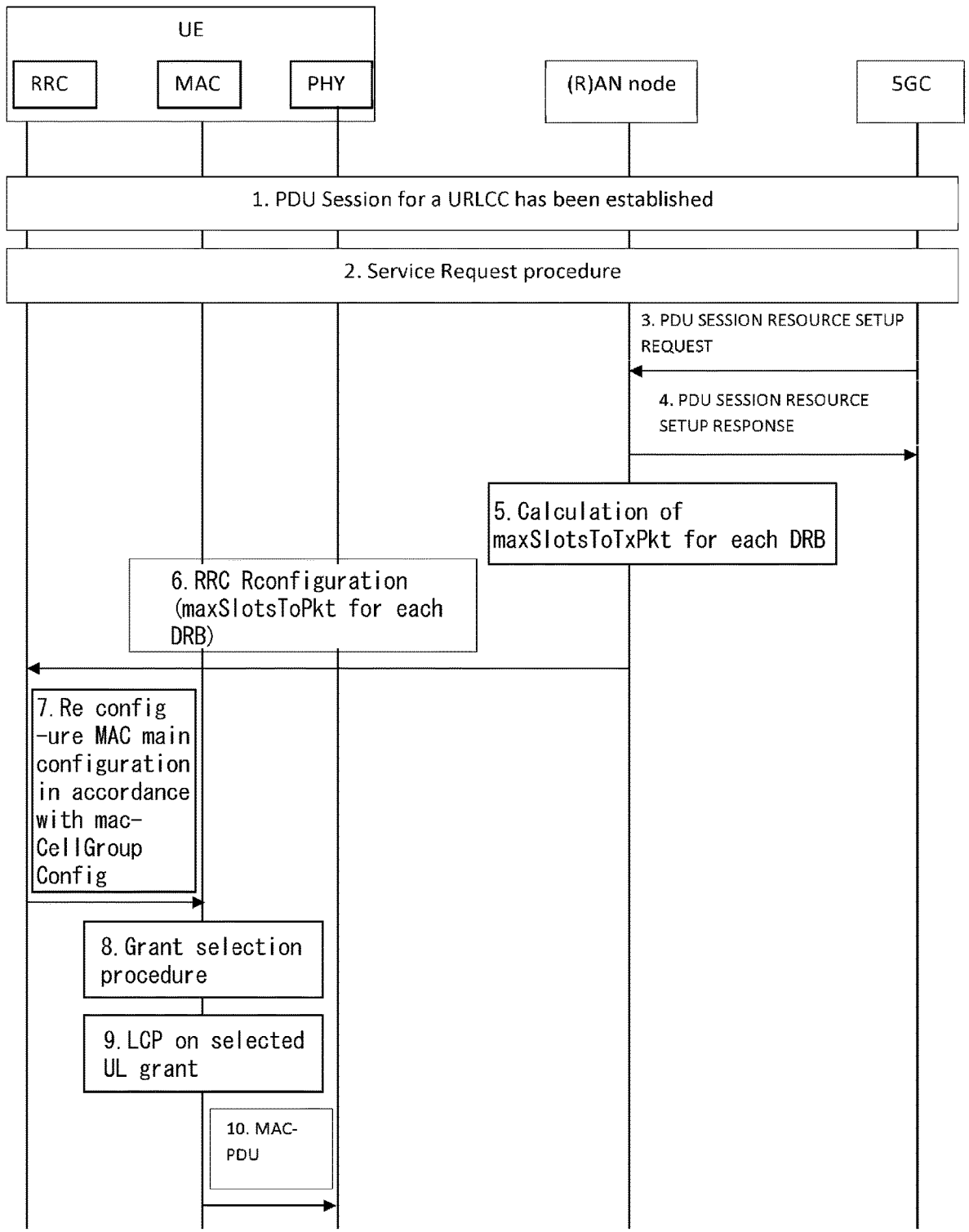
FIG. 4 illustrates Logical Channel Prioritization (LCP) in accordance with an aspect of the present disclosure.

6. In step 6, (R)AN node sends RRC reconfiguration message to the UE, to reconfigure RRC connection. RRC reconfigure procedure is shown in FIG. 3. Logical channel configuration is sent in the RRCReconfiguration IE as shown below.

and filled according to legacy procedure and sends RRCReconfiguration message according to legacy procedure.

```
RRCReconfiguration
   o  radioBearerConfig                                    LogicalChannelConfig
   o  CellGroupConfig                                         o  priority
   o  ...              CellGroupConfig                        o  PBR
                          o  Rlc-Bearer                       o  BSD
                             config        RLC-Bearer Config  o  Allowed
                          o  Mac-cell group  o  RLC-Config       Serving Cells
                             config          o  LogicalChannel o  Allowed-
                          o  ...                Config            SCSlist
                                            o  ...            o  Max Pusch
                                            o  ...               duration
                       MAC-Cell group Config                  o  CG Type 1
                          o  ...                                 allowed
                          o  ...                              o  maxSlotsToTx
                          o  Sequence of                         Pkt
                             (MAC CE
                             Priority)
ASN of Information Element maxSlotsToTxPkt is proposed to define as following
MaxSlotsToTxPkt ::=     ENUMERATED {1, 2, 4, 8, 16, 32, 64, Infinity}
MACCEPriority::=        SEQUENCE {
lcID                    LogicalChannelIdentity
maxSlotsToTxPkt            MaxSlotsToTxPkt
}
```

IE LogicalChannelIdentity is defined in TS38.331. Other Information Elements of RRC reconfiguration is computed and filled according to legacy procedure and sends RRCReconfiguration message according to legacy procedure.

Step C: UE Behaviour Upon RRC Reconfiguration

7. In step 7, once UE RRC receives RRCReconfiguration message, UE may perform actions as mentioned in the TS 38.331 clause 5.3.5.

Upon reception of RRCReconfiguration,

1) If RRCReconfiguration contains CellGroupConfig, UE may perform following actions:

RLC bearer addition/modification: It is performed in accordance with TS 38.331 clause 5.3.5.5.4.
1> if the CellGroupConfig contains the rlc-BearerToAddModList:
2> if the UE's current configuration contains a RLC bearer with the received logicalChannelIdentity:
3> UE reconfigure the logical channel in accordance with the received mac-LogicalChannelConfig:
2> else:
2> If logicalChannelIdentity does not corresponds to SRB:
3> UE configure this MAC entity with a logical channel in accordance to the received mac-LogicalChannelConfig.

MAC entity configuration is performed in accordance with clause 5.3.5.5.5 of TS 38.331.

UE reconfigures the MAC main configuration of the cell group in accordance with the received mac-CellGroupConfig.

MAC reconfiguration is performed according to clause 5.11 of TS 38.321
1> UE apply immediately the configurations received from upper layers for other parameters.
1> UE apply immediately the MAC control configuration received from upper layers.

8. Upon UL grant availability and if available, UL grant is for new transmission, LCP procedure is applied.

IE LogicalChannelIdentity is defined in TS38.331. Other Information Elements of RRC reconfiguration is computed RRC controls the scheduling of uplink data by configuring each logical channel per MAC entity with the following parameters:

priority: where an increasing priority value indicates a lower priority level;

prioritisedBitRate: which sets the Prioritized Bit Rate (PBR);

bucketSizeDuration: which sets the Bucket Size Duration (BSD).

RRC additionally controls the LCP procedure by configuring mapping restrictions for each logical channel with the following parameters:

allowedSCS-List: which sets the allowed Subcarrier Spacing(s) for transmission;

maxPUSCH-Duration: which sets the maximum PUSCH duration allowed for transmission;

configuredGrantType1Allowed: which sets whether a configured grant Type 1 can be used for transmission;

allowedServingCells: which sets the allowed cell(s) for transmission.

maxSlotsToTxPkt: which sets the maxSlotsToTxPkt to prioritize latency critical packets.

The following UE variable is used for the Logical channel prioritization procedure:

Bj which is maintained for each logical channel j.

The MAC entity may initialize Bj of the logical channel to zero when the logical channel is established. For each logical channel j, the MAC entity may:

1> increment Bj by the product PBR×T before every instance of the LCP procedure, where T is the time elapsed since Bj was last incremented;

1> if the value of Bj is greater than the bucket size (i.e. PBR×BSD):
2> set Bj to the bucket size.

It is to be noted that the exact moment(s) when the UE updates Bj between LCP procedures is up to UE implementation, as long as Bj is up to date at the time when a grant is processed by LCP.

Selection of logical channels: (as per 5.4.3.1.2 of TS 38.321)

The MAC entity may perform as herein below, when a new transmission is performed:

1> Select the logical channels for each UL grant that satisfy all the following conditions:
  2> the set of allowed Subcarrier Spacing index values in allowedSCS-List, if configured, includes the Subcarrier Spacing index associated to the UL grant; and
  2> maxPUSCH-Duration, if configured, is larger than or equal to the PUSCH transmission duration associated to the UL grant; and
  2> configuredGrantType1Allowed, if configured, is set to true in case the UL grant is a Configured Grant Type 1; and
  2> allowedServingCells, if configured, includes the Cell information associated to the UL grant. Does not apply to logical channels associated with a DRB configured with PDCP duplication within the same MAC entity (i.e. CA duplication) for which PDCP duplication is deactivated.
1> Prioritization is run over maxSlotsToTxPkt and all LC including MAC CE are arranged in ascending order of maxSlotsToTxPkt. Whenever two maxSlotsToTxPkt are equal, Legacy Priority is to be used to arrange in ascending order of priority.

It is to be noted that the Subcarrier Spacing index, PUSCH transmission duration and Cell information are included in Uplink transmission information received from lower layers for the corresponding scheduled uplink transmission.

Allocation of resources: (as per 5.4.3.1.3 of TS 38.321)

The MAC entity may perform as herein below, when a new transmission is performed:

1> allocate resources to the logical channels as follows:
  2> logical channels selected in sub clause 5.4.3.1.2 for the UL grant with Bj>0 are allocated resources according to newly defined decreasing priority order in the previous step. If the PBR of a logical channel is set to "infinity", the MAC entity may allocate resources for all the data that is available for transmission on the logical channel before meeting the PBR of the lower priority logical channel(s);
  2> decrement Bj by the total size of MAC SDUs served to logical channel j above;
  2> if any resources remain, all the logical channels selected in sub clause 5.4.3.1.2 are served in a strict decreasing priority order (regardless of the value of Bj) until either the data for that logical channel or the UL grant is exhausted, whichever comes first. Logical channels configured with equal priority should be served equally.

It is to be noted that the value of Bj can be negative.

9. UE MAC layer transfer MAC PDU to UE PHY layer for transmission over radio interface according to existing procedure.

In another aspect, the solution of the present application can be divided into four steps as described below:

Step A: PDU Session Creation
1. UE has to establish a PDU session with the network to service URLLC data.
2. Service request procedure.
3. 5GC send PDU session resource setup request to (R)AN node.
4. (R)AN node send PDU session resource setup accept to 5GC.

Step B: RRC Reconfiguration
5. (R)AN node compute maxSlotsToTxPkt for each DRB.
6. (R)AN node computes other Logical Channel Prioritization rules that has to be assigned to UE based on the QoS requested from the 5GC.

Step C: UE Behavior Upon RRC Reconfiguration
7. UE configure UE MAC and UE Logical channels in accordance with the received configuration from RRC reconfiguration.

Step D: Selection of Grant
8. When a grant is available, UE MAC layer perform proposed grant selection procedure.
9. UE MAC layer perform Logical channel prioritization procedure to form MAC PDU.
10. UE MAC layer send MAC PDU (Transport Block (TB)) to UE PHY layer for transmission.

Each of the above-mentioned step is described in details herein below:

Step A: PDU Session Creation
1. In step 1, PDU session for URLLC is established, in this step UE may be informed about the 5QI value associated with QoS flow.
2. In step 2, if the UE is in CM-IDLE state, UE will request service request procedure.
3. In step 3, AMF will request (R)AN node to assign resources on Uu and NG-U for PDU session and the corresponding QoS flows, and may setup corresponding DRBs for a given UE. For each requested PDU session, if resources are available for the requested configuration, the NG-RAN node may establish at least one DRB and associate each accepted QoS flow of the PDU session to a DRB established.

Each PDU session resource setup IE contains, QoS flow level QoS parameters. QoS flow level QoS parameters contain two types of QoS descriptors called Non-dynamic 5QI Descriptor or Dynamic 5QI Descriptor. Each 5QI value is associated with a Packet Delay Budget (PDB).

Non-dynamic 5QI Descriptor IE indicates the QoS characteristics for a standardized or pre-configured 5QI for DL and UL, which are specified in TS 23.501.

Dynamic 5QI Descriptor IE indicates the QoS characteristics for a non-standardized or not pre-configured 5QI for DL and UL, which are defined in TS 38.413-f20 (clause 9.3.1.18). For Dynamic 5QI descriptor, PDB is conveyed in an integer form which has to be multiplied by 0.5 ms to get the PDB value in time.

4. In step 4, Upon assigning the resources on Uu and NG-U for PDU session and corresponding QoS Flows, (R)AN node sends PDU session resource setup response.

Step B: RRC Reconfiguration
5. In step 5, (R)AN node shall compute maxSlotsToTxPkt for each DRB. The maxSlotsToTxPkt may be, for example, maximum number of transmission slots for a plurality of logical channels, or number of allowed transmission slots for a plurality of logical channels.

maxSlotsToTxPkt is defined as maxSlotsToTxPkt=floor (PDB/slotDuration);

The procedure to compute the maxSlotsToTxPkt for each DRB or associated logical channel is explained using an example below.

In a scenario where, four different applications one from each resource type of GBR, Non-GBR and two Delay Critical GBR. Let's consider Application 1: 5QI value=85, PDB on radio interface is 3 ms (Delay Critical GBR)

Application 2: 5QI value=2, PDB on radio interface is 150 ms (GBR)

Application 3: 5QI value=6, PDB on radio interface is 300 ms (Non-GBR)

Application 4: 5QI value=Optional, PDB on radio interface is 0.5 ms (Dynamic 5QI descriptor) (Delay Critical GBR).

In one example, let's consider a UE operating in BWP with SCS of 30 kHz. For 30 kHz SCS of operation, slot duration is 0.5 ms.

Application 1: 5QI value=85, PDB on radio interface is 3 ms, maxSlotsToTxPkt=6

Application 2: 5QI value=2, PDB on radio interface is 150 ms, maxSlotsToTxPkt=300

Application 3: 5QI value=6, PDB on radio interface is 300 ms, maxSlotsToTxPkt=600

Application 4: 5QI value=Optional, PDB on radio interface is 0.5 ms, maxSlotsToTxPkt=1

Introducing a new prioritization parameter at UE is to inform the UE about time criticality of the packet transmission, so that LCP rules consider the latency requirement when selecting between logical channels.

Delay critical GBR for Non-Dynamic 5QI descriptor are in the range from 3 ms to 25 ms. To be precise PDB for 4 delay critical GBR are given by (3, 9, 9, 25) ms as per TS 23.501, and as per TR 22.804, 0.5 ms, 1 ms, 2 ms, 10 ms PDB has to be supported by using Dynamic 5QI descriptor.

TABLE 2

| PDB value | Slot Duration (SCS = 30 kHz) | maxSlotsToTxPkt |
|---|---|---|
| 0.5 ms | 0.5 | 1 |
| 1 ms | 0.5 | 2 |
| 2 ms | 0.5 | 4 |
| 3 ms | 0.5 | 6 |
| 9 ms | 0.5 | 18 |
| 10 ms | 0.5 | 20 |
| 25 ms | 0.5 | 50 |

When quantizing the above values, to save on the number bits used for the signaling, we can send the above information using 3 bit IE by using maxSlotsToTxPkt={1, 2, 4, 8, 16, 32, 64, Infinity}, where any value above 64 is treated as Infinity. In other words Infinity in this context means, application is not delay critical and may not need special treatment where legacy prioritization rules are suffice to serve them.

6. In step 6, (R)AN node sends RRC reconfiguration message to the UE, to reconfigure RRC connection. RRC reconfigure procedure is shown in FIG. 3. Logical channel configuration is sent in the RRCReconfiguration IE as shown below.

```
RRCReconfiguration                                                    LogicalChannelConfig
    o  radioBearerConfig                                                  o  priority
    o  CellGroupConfig      CellGroupConfig                               o  PBR
    o  ...                      o  Rlc-Bearer                             o  BSD
                                    config                                o  Allowed
                                o  Mac-cell group     RLC-Bearer Config      Serving Cells
                                    config                o  RLC-Config   o  Allowed-
                                o  ...                    o  LogicalChannel   SCSlist
                                                              Config       o  Max Pusch
                                                          o  ...              duration
                            MAC-Cell group Config         o  ...           o  CG Type 1
                                o  ...                                        allowed
                                o  ...         19                          o  maxSlotsToTx
                                o  Sequence of                                Pkt
                                    (MAC CE
                                    Priority)
ASN of Information Element maxSlotsToTxPkt is proposed to define as following
MaxSlotsToTxPkt ::=    ENUMERATED {1, 2, 4, 8, 16, 32, 64, Infinity}
MACCEPriority::=       SEQUENCE {
lcID                   LogicalChannelIdentity
maxSlotsToTxPkt        MaxSlotsToTxPkt
}
```

IE LogicalChannelIdentity is defined in TS38.331. Other Information Elements of RRC reconfiguration is computed and filled according to legacy procedure and sends RRCReconfiguration message according to legacy procedure.

Step C: UE Behaviour Upon RRC Reconfiguration

7. In step 7, once UE RRC receives RRCReconfiguration message, UE may perform actions as mentioned in the TS 38.331 clause 5.3.5.

Upon reception of RRCReconfiguration,

1) If RRCReconfiguration contains CellGroupConfig, UE may perform following actions:
RLC bearer addition/modification is performed in accordance with TS 38.331 clause 5.3.5.5.4.
1> if the CellGroupConfig contains the rlc-BearerToAddModList:
  2> if the UE's current configuration contains a RLC bearer with the received logicalChannelIdentity:
    3> UE reconfigure the logical channel in accordance with the received mac-LogicalChannelConfig:
  2> else:
    2> If logicalChannelIdentity does not corresponds to SRB:
      3> UE configure this MAC entity with a logical channel in accordance to the received mac-LogicalChannelConfig.

MAC entity configuration is performed in accordance with clause 5.3.5.5.5 of TS 38.331. UE reconfigure the MAC main configuration of the cell group in accordance with the received mac-CellGroupConfig.

MAC reconfiguration: It is performed according to clause 5.11 of TS 38.321.

1> UE apply immediately the configurations received from upper layers for other parameters.

1> UE apply immediately the MAC control configuration received from upper layers.

8. In step 8, Grant selection procedure takes place.

As discussed above, when there is a more than one type of grant available for transmission, current 38.321 specification grant selection rules may not give desired output. We propose to define a new variable named prioritization factor or $P_{factor}$ to solve grant selection problem.

$P_{factor}$=sum(maxSlotsToTxPkt$_{LCi}$), where maxSlotsToTxPkt$_{LCi}$ is the maxSlotsToTxPkt of Logical channel i (LCi) selected for transmission in the grant.

When multiple grants of overlapping set of PUSCH resources are available, UE runs a hypothetical LCP procedure and compute $P_{factor}$ for each grant. UE select the grant which has least $P_{factor}$ to transmit in the respective slot/transmission opportunity. In other words $P_{factor}$ roughly indicates the time criticality of data particular UL grant is going to carry. UE chooses a grant with the least $P_{factor}$ implies, giving priority to the grant which carries most time critical data.

In one example, if a UE is operating in BWP with SCS of 30 kHz. For 30 kHz SCS of operation, slot duration is 0.5 ms.

Application 1: 5QI value=85, PDB on radio interface is 3 ms, maxSlotsToTxPkt=6

Application 2: 5QI value=2, PDB on radio interface is 150 ms, maxSlotsToTxPkt=Infinity Application 3: 5QI value=6, PDB on radio interface is 300 ms, maxSlotsToTxPkt=Infinity Application 4: 5QI value=Optional, PDB on radio interface is 0.5 ms, maxSlotsToTxPkt=1.

Since Infinity here means that application is not delay critical, for computation of $P_{factor}$ we can consider number higher than 64, for example we can consider 100/200/500 as it is used for relative computation/comparison. In this example let's consider Infinity=100.

For Grant 1: If Application 1 and 4 are selected for grant its $P_{factor}$=1+6=7.

For Grant 2: If Application 1 and 2 are selected for grant its $P_{factor}$=1+100=101.

By selecting a grant whose $P_{factor}$ is least among the grants Grant 1 is selected for transmission.

9. In step 9, upon UL grant selection according to step 8 in case of multiple grants colliding, perform LCP according to below steps.

RRC controls the scheduling of uplink data by configuring each logical channel per MAC entity with the following parameters:
  priority: where an increasing priority value indicates a lower priority level;
  prioritisedBitRate: which sets the Prioritized Bit Rate (PBR);
  bucketSizeDuration: which sets the Bucket Size Duration (BSD).

RRC additionally controls the LCP procedure by configuring mapping restrictions for each logical channel with the following parameters:
  allowedSCS-List: which sets the allowed Subcarrier Spacing(s) for transmission;
  maxPUSCH-Duration: which sets the maximum PUSCH duration allowed for transmission;
  configuredGrantType1Allowed: which sets whether a configured grant Type 1 can be used for transmission;
  allowedServingCells: which sets the allowed cell(s) for transmission;
  maxSlotsToTxPkt: which sets the maxSlotsToTxPkt to prioritize latency critical packets.

The following UE variable is used for the Logical channel prioritization procedure:
  Bj which is maintained for each logical channel j.

The MAC entity may initialize Bj of the logical channel to zero when the logical channel is established.

For each logical channel j, the MAC entity may:
  1> increment Bj by the product PBR×T before every instance of the LCP procedure, where T is the time elapsed since Bj was last incremented;
  1> if the value of Bj is greater than the bucket size (i.e. PBR×BSD):
    2> set Bj to the bucket size.

It is to be noted that the exact moment(s) when the UE updates Bj between LCP procedures is up to UE implementation, as long as Bj is up to date at the time when a grant is processed by LCP.

Selection of logical channels: (as per 5.4.3.1.2 of TS 38.321)

The MAC entity may perform as follows, when a new transmission is performed:
  1> MAC entity Select the logical channels for each UL grant that satisfy all the following conditions:
    2> the set of allowed Subcarrier Spacing index values in allowedSCS-List, if configured, includes the Subcarrier Spacing index associated to the UL grant; and
    2> maxPUSCH-Duration, if configured, is larger than or equal to the PUSCH transmission duration associated to the UL grant; and
    2> configuredGrantType1Allowed, if configured, is set to true in case the UL grant is a Configured Grant Type 1; and 2> allowedServingCells, if configured, includes the Cell information associated to the UL grant. Does not apply to logical channels associated with a DRB configured with PDCP duplication within the same MAC entity (i.e. CA duplication) for which PDCP duplication is deactivated.

1> MAC entity Run prioritization over maxSlotsToTxPkt and arrange all LC including MAC CE in ascending order of maxSlotsToTxPkt. Whenever two maxSlotsToTxPkt are equal, Legacy Priority to be used to arrange in ascending order of priority.

It is to be noted that the Subcarrier Spacing index, PUSCH transmission duration and Cell information are included in Uplink transmission information received from lower layers for the corresponding scheduled uplink transmission.

Allocation of resources: (as per 5.4.3.1.3 of TS 38.321)

The MAC entity may, when a new transmission is performed:

1> MAC entity allocate resources to the logical channels as follows:

2> Logical channels selected in sub clause 5.4.3.1.2 for the UL grant with Bj>0 are allocated resources according to newly defined decreasing priority order in the previous step. If the PBR of a logical channel is set to "infinity", the MAC entity may allocate resources for all the data that is available for transmission on the logical channel before meeting the PBR of the lower priority logical channel(s);

2> decrement Bj by the total size of MAC SDUs served to logical channel j above;

2> if any resources remain, all the logical channels selected in sub clause 5.4.3.1.2 are served in a strict decreasing priority order (regardless of the value of Bj) until either the data for that logical channel or the UL grant is exhausted, whichever comes first. Logical channels configured with equal priority should be served equally.

It is to be noted that the value of Bj can be negative.

10. In step 10, UE transfers MAC PDU to PHY layer for transmission over radio interface according to existing procedure.

Figure 5:
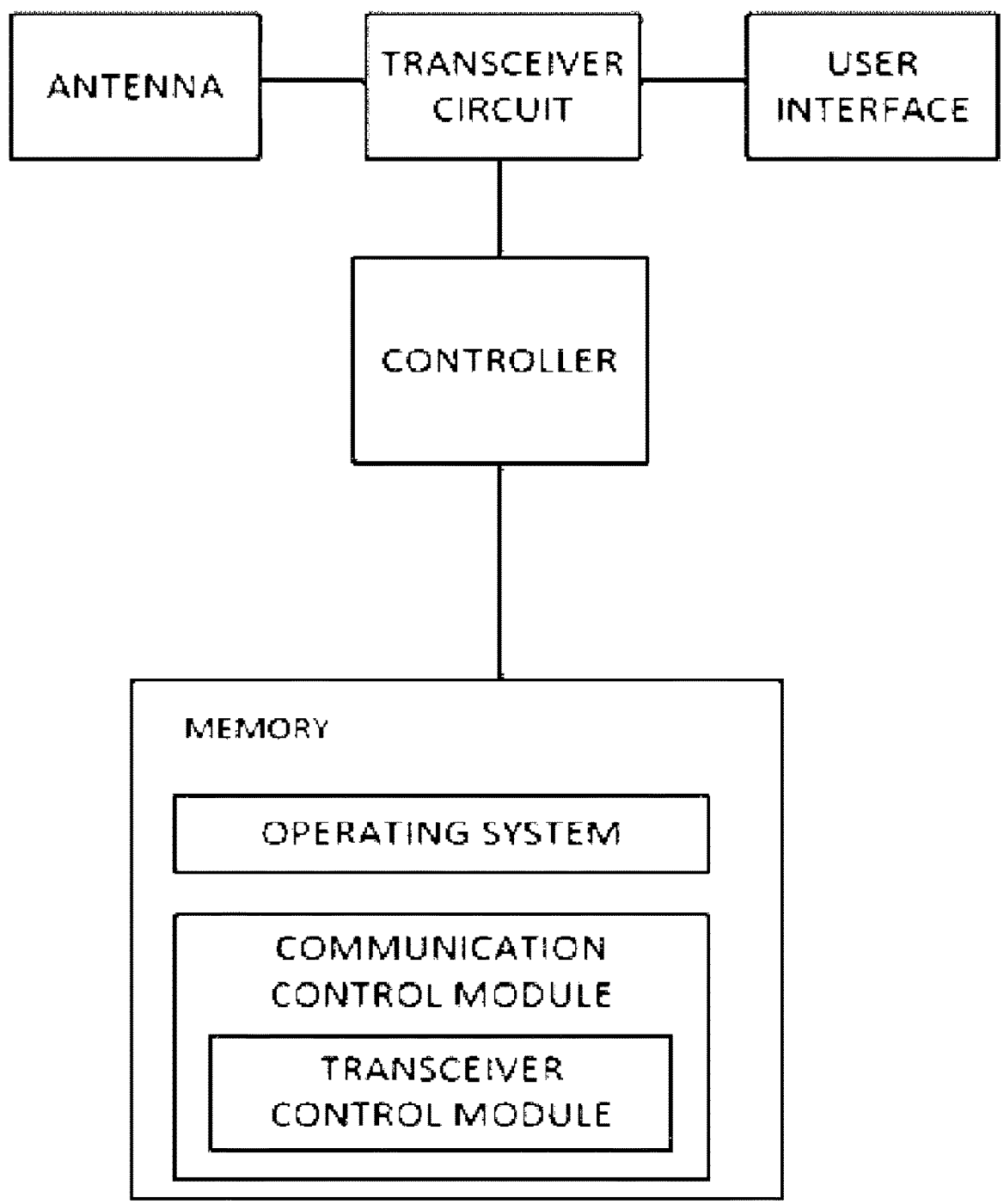
FIG. 5 shows a block diagram for a user equipment in accordance with the present disclosure.

FIG. 5 is a block diagram illustrating the main components of the UE. As shown, the UE includes a transceiver circuit which is operable to transmit signals to and to receive signals from the connected node(s) via one or more antenna. Although not necessarily shown in FIG. 5, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller controls the operation of the UE in accordance with software stored in a memory. For example, the controller may be realized by Central Processing Unit (CPU). The software includes, among other things, an operating system and a communications control module having at least a transceiver control module. The communications control module (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages,), NAS messages such as periodic location update related messages (e.g. tracking area update, paging area updates, location area update) etc.

Figure 6:
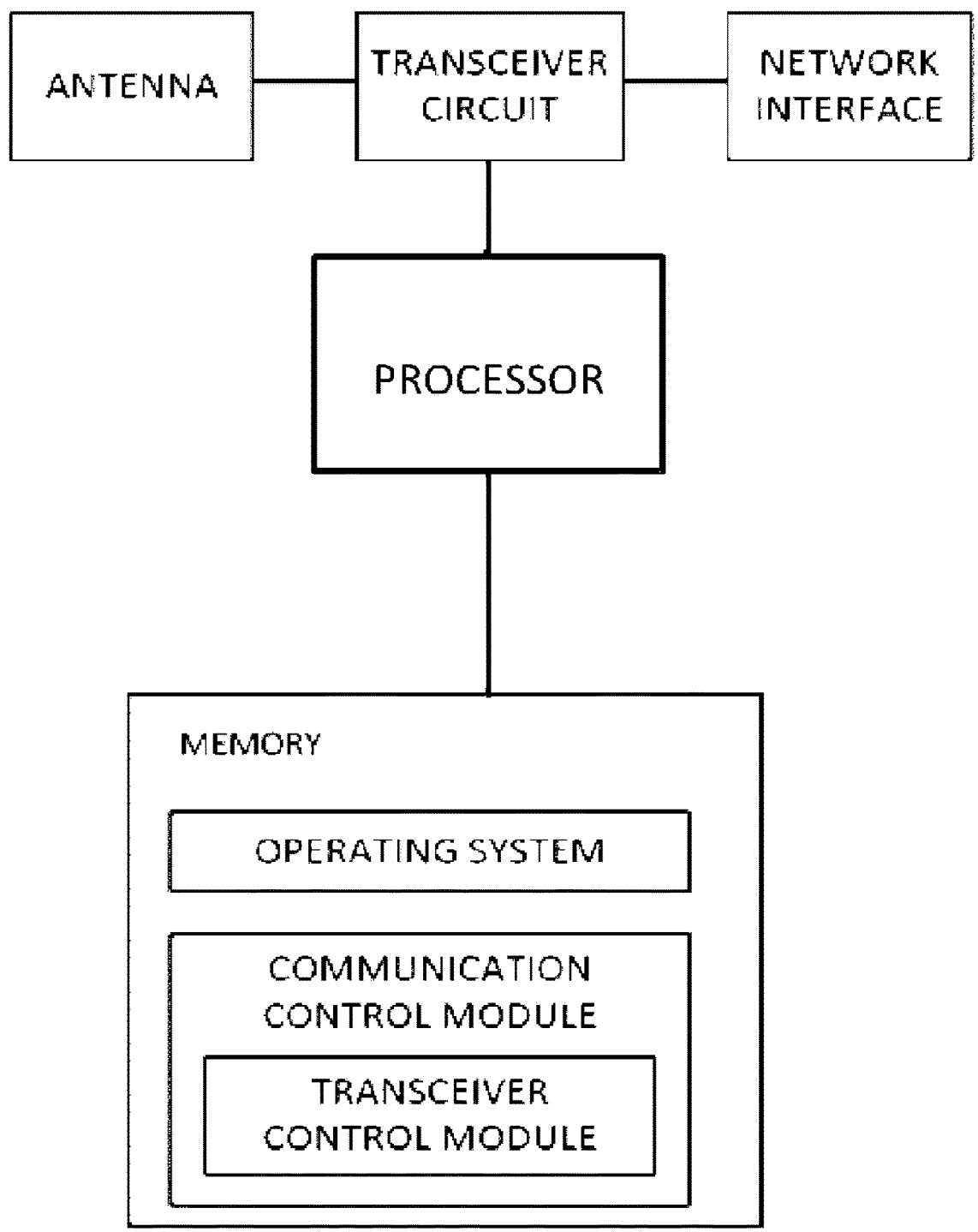
FIG. 6 shows a block diagram for an (R)AN node in accordance with the present disclosure.

FIG. 6 is a block diagram illustrating the main components of an exemplary (R)AN node, for example a base station ('eNB' in LTE, 'gNB' or 'ngNB' in 5G). As shown, the (R)AN node includes a transceiver circuit which is operable to transmit signals to and to receive signals from connected UE(s) via one or more antenna and to transmit signals to and to receive signals from other network nodes (either directly or indirectly) via a network interface. A controller controls the operation of the (R)AN node in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

Figure 7:
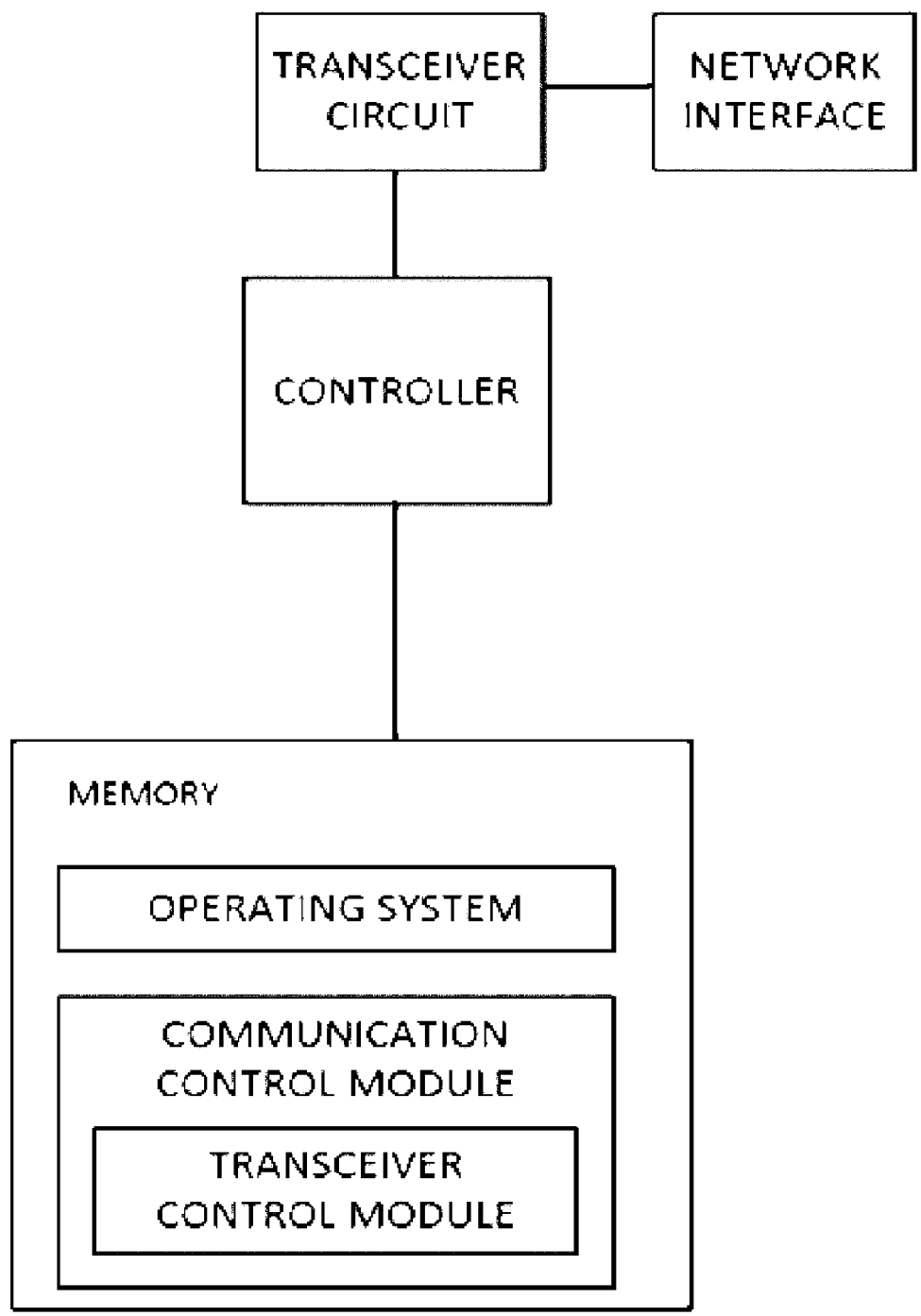
FIG. 7 shows a block diagram for a core network node in accordance with the present disclosure.

FIG. 7 is a block diagram illustrating the main components of an exemplary core network node, for example an AMF, a SMF, a SEAF, an AUSF, an UPF, an UDM, an ARPF, SIDF, a PCF, an AF etc. The core network node is included in the 5GC. As shown, the core network node includes a transceiver circuit which is operable to transmit signals to and to receive signals from other nodes (including the UE) via a network interface. A controller controls the operation of the core network node in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the core network node and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The AMF is the Access and Mobility Management Function. It is a network element in a mobile network that keeps a register of connected UEs and manages the mobility aspects of these UEs.

The SMF is the Session Management Function. It is a network element in a mobile network and manages the sessions of UEs connected to the network.

The SEAF is the Security Anchor Function. It is a network element in a mobile network that serves as the security anchor. The SEAF holds the anchor key for each UE that is connected to the network.

The AUSF is the Authentication Server Function. It is a network element in a mobile network that manages the authentication of the UEs that connect to a network.

The UPF is the User Plane Function. It is a network element in a mobile network that terminates the user plane to the UE, or routes the user plane from a UE to another UPF.

The UDM is a Unified Data Management node. It is a network element in a mobile network that manages the data related to for example subscribers. Part of the UDM are a registry with subscriber identities and secret keys, also called the ARPF or the Authentication Center (AuC).

The ARPF is the Authentication credentials Repository Function. It is a network element that stores and processes the subscriber credentials, such as the subscriber identity and the secret key.

The SIDF is the SUCI (Subscriber Concealed Identifier) Deconcealing Function. It is a network node that holds the home network private key and decrypts or deconceals the SUCI to obtain the SUPI (Subscriber Permanent Identity).

The network elements can be implemented as logical functions and can be hosted on a single network node. For example, the UDM, SIDF, and ARPF will commonly be one network node performing all the functions of the individual network elements.

The terms "slot" in this present disclosure can be replaced by (OFDM) symbol. The slot is used just as one of examples and (OFDM) symbol can be used instead unless specifically stated otherwise. The terms "slot" in this present disclosure is a time unit. It can be of duration of varying number of OFDM symbol length(s).

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally)

stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 3

Some examples of machine type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ | Sensors |
| Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

For the purposes of the present document, the terms and definitions given in 3GPP TR 21.905 [1] and the following apply. A term defined in the present document takes precedence over the definition of the same term, if any, in 3GPP TR 21.905 [1].

An abbreviation defined in the present document takes precedence over the definition of the same abbreviation, if any, in 3GPP TR 21.905 [1].

5GC 5G Core Network
5GS 5G System
5G-AN 5G Access Network
5QI 5G QoS Identifier
AMF Access and Mobility Management Function
AN Access Node
AS Access Stratum
BWP Band Width Part
CP Control Plane
DL Downlink
DN Data Network
DNAI DN Access Identifier
DNN Data Network Name
EPS Evolved Packet System
EPC Evolved Packet Core
GFBR Guaranteed Flow Bit Rate
I-RNTI I-Radio Network Temporary Identifier
MAC Medium Access Control
MFBR Maximum Flow Bit Rate
MME Mobility Management Entity
NAS Non-Access Stratum
NG-RAN Next Generation Radio Access Network
NR New Radio
PDB Packet Delay Budget
PER Packet Error Rate
PDCCH Physical Downlink Control Channel
PDSCH Physical Downlink Shared Channel
PUCCH Physical Uplink Control Channel
PUSCH Physical Uplink Shared Channel
QFI QoS Flow Identifier
QoE Quality of Experience
(R)AN (Radio) Access Network
RLC Radio Link Control
RQA Reflective QoS Attribute
RQI Reflective QoS Indication
RRC Radio Resource Control
SA NR Standalone New Radio
SCS Sub Carrier Spacing
SDAP Service Data Adaptation Protocol
SMF Session Management Function
UL Uplink
UPF User Plane Function
OS Operating System
MO Mobile Originated
MT Mobile Terminated
USIM Universal Subscriber Identity Module
UICC Universal integrated circuit card Further, the content of the above-mentioned exemplary aspects can be expressed as follows. For example, the whole or part of the exemplary aspects disclosed above can be described as, but not limited to, the following supplementary notes.

(Supplementary Note 1)
A method for a User Equipment (UE), the method comprising:
establishing a communication session with a network node for transmission of data;
receiving a configuration message indicating information for one or more of transmission slots for a plurality of logical channels;
setting up for transmission of data based on the received configuration message to select one or more logical channels of the plurality of logical channels; and
prioritizing the selection of plurality of logical channels when the UE is indicative of initiation of transmission of data.

(Supplementary Note 2)
The method according to Supplementary Note 1, wherein the setting up of the UE is based on at least one of:
addition of Radio Link Control (RLC) bearer,
modification of RLC bearer,
Medium Access Control (MAC) entity configuration, and
MAC reconfiguration.

(Supplementary Note 3)
The method according to Supplementary Note 1, wherein the transmission of data is configured for each logical channel per MAC entity based on at least one of:
increasing priority value,
Prioritized Bit Rate (PBR), and
Bucket Size Duration (BSD).

(Supplementary Note 4)
The method according to Supplementary Note 1, wherein the prioritization is regulated by configuring mapping restrictions for each logical channel based on at least one of:
allowed Subcarrier Spacing(s) for transmission,
maximum Physical Uplink Shared Channel (PUSCH) duration,
grant type, and
allowed cell, or number of allowed transmission slots.

(Supplementary Note 5)
The method according to Supplementary Note 1, wherein, in an event of availability of more than one uplink grants, the method comprises:
prioritizing the plurality of logical channels to determine a parameter with an arbitrary value for each of the uplink grants; and
selecting an uplink grant with the determined parameter having the minimum arbitrary value for the transmission of data in a transmission session.

(Supplementary Note 6)
The method according to Supplementary Note 5,
wherein the transmission of data is performed in a descending order of time critical data for the transmission session, and
wherein the transmission of data is based on a selection of the uplink grant.

(Supplementary Note 7)
A User Equipment (UE) comprising:
at least one radio transceiver; and
at least one processor coupled to the at least one radio transceiver,
wherein the at least one processor is configured to:
establish a communication session with a network node for transmission of data;
receive a configuration message indicating information for one or more of transmission slots for a plurality of logical channels;
set up for transmission of data based on the received configuration message to select one or more logical channels of the plurality of logical channels; and
prioritize the selection of plurality of logical channels when the UE is indicative of initiation of transmission of data.

(Supplementary Note 8)
The UE according to Supplementary Note 7, wherein the setting up is based on at least one of:
addition of Radio Link Control (RLC) bearer,
modification of RLC bearer,
Medium Access Control (MAC) entity configuration, and
MAC reconfiguration.

(Supplementary Note 9)
The UE according to Supplementary Note 7, wherein the transmission of data is configured for each logical channel per MAC entity based on at least one of:
increasing priority value,
Prioritized Bit Rate (PBR), and
Bucket Size Duration (BSD).

(Supplementary Note 10)
The UE according to Supplementary Note 7, wherein the prioritization is regulated by configuring mapping restrictions for each logical channel based on at least one of:
allowed Subcarrier Spacing(s) for transmission,
maximum Physical Uplink Shared Channel (PUSCH) duration,
grant type,
allowed cell, and
number of allowed transmission slots.

(Supplementary Note 11)
The UE according to Supplementary Note 7, wherein, in an event of availability of more than one uplink grants, the at least one processor is configured to:
prioritize the plurality of logical channels to determine a parameter with an arbitrary value for each of the uplink grants; and
select an uplink grant with the determined parameter having the minimum arbitrary value for the transmission of data in a transmission session.

(Supplementary Note 12)
The UE according to Supplementary Note 11,
wherein the transmission of data is performed in a descending order of time critical data for the transmission session, and
wherein the transmission of data is based on a selection of the uplink grant.

(Supplementary Note 13)
A network node for enhancing logical channel prioritization for transmission of data with a UE, the node comprising:
at least one processor controller;
at least one transceiver circuit operatively coupled with the at least one processor;
at least one network interface operatively coupled with the at least one processor; and
at least one memory operatively coupled with the at least one processor,
wherein the processor causes the network node to:
establish a communication session with a UE for the transmission of data;
receive a session resource setup request sent from a core network;
send a session resource setup response to the session resource setup request to the core network; and send a configuration message indicating information for one or more of transmission slots for a plurality of logical channels for the UE to the UE, wherein the UE is set up for the transmission of data based on the configuration message to select one or more logical channels of the plurality of logical channels, and wherein the selection of plurality of logical channels are prioritized when the network node is being indicative of initiation of the transmission of data.

(Supplementary Note 14)

The network node according to Supplementary Note 13, wherein
the setting up is based on at least one of:
addition of Radio Link Control (RLC) bearer,
modification of RLC bearer,
Medium Access Control (MAC) entity configuration, and
MAC reconfiguration.

(Supplementary Note 15)

The network node according to Supplementary Note 13, wherein
the transmission of data is configured for each logical channel per MAC entity based on at least one of:
increasing priority value,
Prioritized Bit Rate (PBR), and
Bucket Size Duration (BSD).

(Supplementary Note 16)

The network node according to Supplementary Note 13, wherein
the prioritization is regulated by configuring mapping restrictions for each logical channel based on at least one of:
allowed Subcarrier Spacing(s) for transmission,
maximum Physical Uplink Shared Channel (PUSCH) duration,
grant type,
allowed cell, and
number of allowed transmission slots.

(Supplementary Note 17)

The network node according to Supplementary Note 13, wherein, in an event of availability of more than one uplink grants,
the plurality of logical channels is prioritized to determine a parameter with an arbitrary value for each of the uplink grants; and
an uplink grant is selected with the determined parameter having the minimum arbitrary value for the transmission of data in a transmission session.

(Supplementary Note 18)

The network node according to Supplementary Note 17, wherein the transmission of data is performed in a descending order of time critical data for the transmission session, and
wherein the transmission of data is based on a selection of the uplink grant.

(Supplementary Note 19)

A method for a network node, the method comprising:
establishing a communication session with a UE for transmission of data;
receiving a session resource setup request sent from a core network;
sending a session resource setup response to the session resource setup request to the core network; and
sending a configuration message indicating information for one or more of transmission slots for a plurality of logical channels for the UE to the UE, wherein the UE is set up for the transmission of data based on the configuration message to select one or more logical channels of the plurality of logical channels, and wherein the selection of plurality of logical channels are prioritized when the network node is being indicative of initiation of the transmission of data.

(Supplementary Note 20)

The method according to Supplementary Note 19, wherein
the setting up of the UE is based on at least one of:
addition of Radio Link Control (RLC) bearer,
modification of RLC bearer,
Medium Access Control (MAC) entity configuration, and
MAC reconfiguration.

(Supplementary Note 21)

The method according to Supplementary Note 19, wherein
the transmission of data is configured for each logical channel per MAC entity based on at least one of:
increasing priority value,
Prioritized Bit Rate (PBR), and
Bucket Size Duration (BSD).

(Supplementary Note 22)

The method according to Supplementary Note 19, wherein
the prioritization is regulated by configuring mapping restrictions for each logical channel based on at least one of:
allowed Subcarrier Spacing(s) for transmission,
maximum Physical Uplink Shared Channel (PUSCH) duration,
grant type,
allowed cell, and
number of allowed transmission slots.

(Supplementary Note 23)

The method according to Supplementary Note 19, wherein, in an event of availability of more than one uplink grants, the method comprises:
prioritizing the plurality of logical channels to determine a parameter with an arbitrary value for each of the uplink grants; and
selecting an uplink grant with the determined parameter having the minimum arbitrary value for the transmission of data in a transmission session.

(Supplementary Note 24)

The method according to Supplementary Note 23, wherein the transmission of data is performed in a descending order of time critical data for the transmission session, and
wherein the transmission of data is based on a selection of the uplink grant.

(Supplementary Note 25)

The method according to Supplementary Note 1, wherein the information for one or more of transmission slots are maximum number of transmission slots or number of allowed transmission slots.

(Supplementary Note 26)

The UE according to Supplementary Note 8, wherein the information for one or more of transmission slots are maximum number of transmission slots or number of allowed transmission slots.

(Supplementary Note 27)

The network node according to Supplementary Note 13, wherein the information for one or more of transmission slots are maximum number of transmission slots or number of allowed transmission slots.

(Supplementary Note 28)

The method according to Supplementary Note 19, wherein the information for one or more of transmission slots are maximum number of transmission slots or number of allowed transmission slots.

Although the present invention has been described with reference to the exemplary aspects, the present invention is not limited to the above. Various changes that can be understood by those skilled in the art can be made to the configuration and details of the present invention within the scope of the invention.

This application is based upon and claims the benefit of priority from India Patent Application No. 201911012023, filed on Mar. 27, 2019, the disclosure of which is incorporated herein in its entirety by reference.

What is claimed is:

1. A method for a User Equipment (UE), the method comprising:
   establishing a communication session with a network node;
   receiving, from the network node, a configuration message indicating information for one or more of transmission slots for a plurality of logical channels;
   setting up, based on the configuration message, for transmission of data to select one or more logical channels of the plurality of logical channels; and
   prioritizing the selection of the one or more logical channels of the plurality of logical channels in a case where initiation of the transmission of the data is indicated.

2. The method according to claim 1, wherein
   the setting up of the UE is based on at least one of:
   addition of Radio Link Control (RLC) bearer,
   modification of RLC bearer,
   Medium Access Control (MAC) entity configuration, and
   MAC reconfiguration.

3. The method according to claim 1, wherein
   the transmission of the data is configured for each logical channel per MAC entity based on at least one of:
   increasing priority value,
   Prioritized Bit Rate (PBR), and
   Bucket Size Duration (BSD).

4. The method according to claim 1, wherein
   the prioritizing is regulated by configuring mapping restrictions for each logical channel based on at least one of:
   allowed Subcarrier Spacing(s) for transmission,
   maximum Physical Uplink Shared Channel (PUSCH) duration,
   grant type,
   allowed cell, and
   number of allowed transmission slots.

5. The method according to claim 1, wherein, in an event of availability of more than one uplink grants, the method comprises:
   prioritizing the plurality of logical channels to determine a parameter with an arbitrary value for each of the uplink grants; and
   selecting an uplink grant with determined parameter from the parameter for the transmission of data in a transmission session wherein the determined parameter corresponds to a minimum arbitrary value.

6. The method according to claim 5, further comprising:
   transmitting the data, based on the uplink grant, in a descending order of time critical data for the transmission session.

7. The method according to claim 1,
   wherein the information for one or more of transmission slots are maximum number of transmission slots or number of allowed transmission slots.

8. A User Equipment (UE) comprising:
   a memory storing instructions; and
   at least one hardware processor configured to process the instructions to:
   establish a communication session with a network node;
   receive, from the network node, a configuration message indicating information for one or more of transmission slots for a plurality of logical channels;
   set up, based on the configuration message, for transmission of data to select one or more logical channels of the plurality of logical channels; and
   prioritize the selection of the one or more logical channels of the plurality of logical channels in a case where initiation of the transmission of the data is indicated.

9. A method for a network node, the method comprising:
   establishing a communication session with a User Equipment (UE);
   receiving a request for setting up a session resource from a core network node;
   sending a response to the request to the core network node; and
   sending a configuration message indicating information for one or more of transmission slots for a plurality of logical channels to the UE,
   wherein the UE is set up, based on the configuration message, for transmission of data to select one or more logical channels of the plurality of logical channels,
   wherein the selection of the one or more logical channels of the plurality of logical channels are prioritized in a case where initiation of the transmission of data is indicated.

10. The method according to claim 9, wherein
    the UE is set up based on at least one of:
    addition of Radio Link Control (RLC) bearer,
    modification of RLC bearer,
    Medium Access Control (MAC) entity configuration, and
    MAC reconfiguration.

11. The method according to claim 9, wherein
    the transmission of the data is configured for each logical channel per MAC entity based on at least one of:
    increasing priority value,
    Prioritized Bit Rate (PBR), and
    Bucket Size Duration (BSD).

12. The method according to claim 9, wherein
    the prioritization of the selection of the one or more logical channels of the plurality of logical channels is regulated by configuring mapping restrictions for each logical channel based on at least one of:
    allowed Subcarrier Spacing(s) for transmission,
    maximum Physical Uplink Shared Channel (PUSCH) duration,
    grant type,
    allowed cell, and
    number of allowed transmission slots.

13. The method according to claim 9, wherein, in an event of availability of more than one uplink grants, the method comprises:
    prioritizing the plurality of logical channels to determine a parameter with an arbitrary value for each of the uplink grants; and
    selecting an uplink grant with the determined parameter having the minimum arbitrary value for the transmission of data in a transmission session.

14. The method according to claim 13,
wherein the transmission of data is performed in a descending order of time critical data for the transmission session, and
wherein the transmission of data is based on a selection of the uplink grant.

15. The method according to claim 9,
wherein the information for one or more of transmission slots are maximum number of transmission slots or number of allowed transmission slots.

* * * * *